(12) United States Patent
Hasegawa

(10) Patent No.: US 7,694,172 B2
(45) Date of Patent: Apr. 6, 2010

(54) DATA BACKUP DEVICE, DATA BACKUP METHOD, AND RECORDING MEDIUM STORING DATA BACKUP PROGRAM

(75) Inventor: Kenji Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 384 days.

(21) Appl. No.: 11/712,894

(22) Filed: Mar. 2, 2007

(65) Prior Publication Data

US 2007/0226439 A1 Sep. 27, 2007

(30) Foreign Application Priority Data

Mar. 10, 2006 (JP) .............................. 2006-065890

(51) Int. Cl.
G06F 11/00 (2006.01)
(52) U.S. Cl. .......................................... 714/6; 711/162
(58) Field of Classification Search ........................ None
See application file for complete search history.

(56) References Cited

U.S. PATENT DOCUMENTS

| 6,959,369 B1 * | 10/2005 | Ashton et al. ................ 711/162 |
| 7,139,826 B2 | 11/2006 | Watanabe et al. |
| 7,313,578 B2 * | 12/2007 | Gagne et al. ................. 707/204 |
| 7,472,173 B2 | 12/2008 | Maruyama et al. |
| 2003/0014534 A1 | 1/2003 | Watanabe et al. |
| 2005/0188165 A1 * | 8/2005 | Wolfgang et al. ............ 711/162 |
| 2005/0210078 A1 | 9/2005 | Maruyama et al. |
| 2005/0267916 A1 | 12/2005 | Tone et al. |
| 2006/0047999 A1 * | 3/2006 | Passerini et al. ................ 714/6 |
| 2006/0129875 A1 * | 6/2006 | Barrall .......................... 714/6 |
| 2009/0106400 A1 | 4/2009 | Maruyama et al. |

FOREIGN PATENT DOCUMENTS

| JP | 2003-099306 | 4/2003 |
| JP | 2003-099309 | 4/2003 |
| JP | 2004-303122 | 10/2004 |
| JP | 2005-196387 | 7/2005 |
| JP | 2005-267216 | 9/2005 |

OTHER PUBLICATIONS

Japanese Patent Office issued a Japanese Office Action dated Dec. 22, 2009, Application No. 2006-065890.

* cited by examiner

Primary Examiner—Christopher S McCarthy
(74) Attorney, Agent, or Firm—Young & Thompson

(57) ABSTRACT

A data backup device according to the present invention comprises a first table, a second table, an update management part configured to perform recording in the second table an identifier of updated portion of a first memory, a table rewriting part configured to perform rewriting the first table such that the first table identifies the portion of the first memory identified by the second table, and a data copy control part configured to perform output of first data from the portion of the first memory identified by the first table.

8 Claims, 6 Drawing Sheets

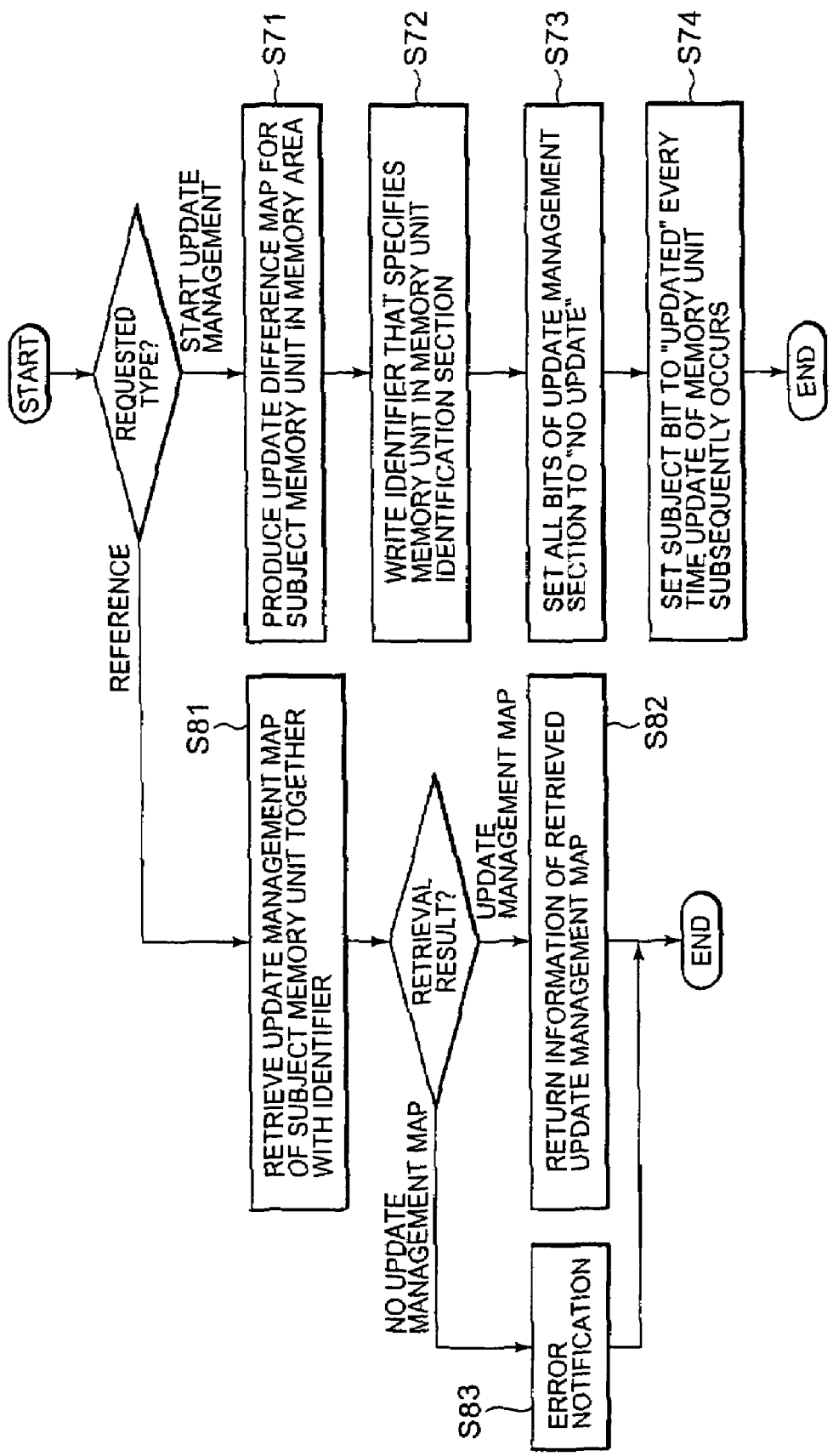

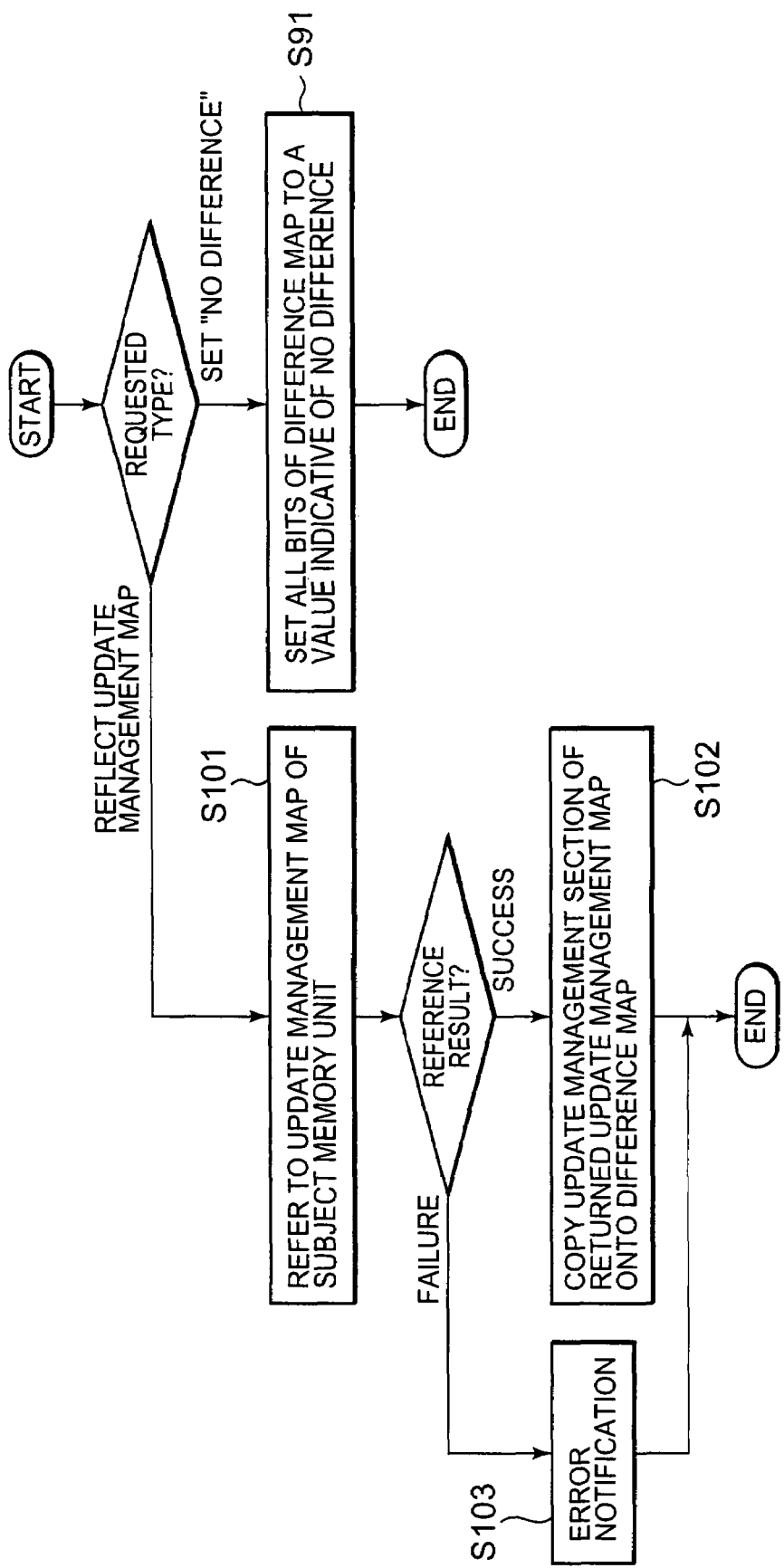

DATA BACKUP DEVICE, DATA BACKUP METHOD, AND RECORDING MEDIUM STORING DATA BACKUP PROGRAM

BACKGROUND OF THE INVENTION

1. Field of the Invention

The present invention relates to a data backup device, a data backup method, and a recording medium storing data backup program. In particular, the present invention relates to backing up data between plural data centers in a disaster recovery system.

2. Description of the Related Art

A disaster recovery system with a primary data center and backup center (secondary data center) is known. The secondary data center backs up the primary data center in case of a disaster such as earthquake or flood.

In many disaster recovery systems having the secondary data center, the primary data center and the secondary data center are geographically separate from each other. And replicated data of a memory unit in a storage device of the primary data center is stored in the memory unit in the storage device of the secondary data center.

The following two types of methods are used for copying data from the memory unit in the primary data center (primary memory unit) to the memory unit in the secondary data center (secondary. memory unit).

1. A method in which the contents of the primary memory unit are copied to a removable storage medium such as a magnetic tape, and mailed to the secondary data center, and the contents of the storage medium are stored to the secondary memory unit.

2. A method in which data is copied from primary memory unit to secondary memory unit using a data copying function of the storage device via a communication line that connects the primary data center and the secondary data center.

In the first backup method which uses a removable storage medium, 1) the data of the primary memory unit are saved in the recording medium, 2) the storage medium is mailed to the secondary data center from the primary data center, and 3) the data in the recording medium are written to the secondary memory unit. The above troublesome work is required every time data is backed up from the primary data center to the secondary data center. The disadvantage becomes more conspicuous when a frequent back ups are required. The frequency of data back ups may be decreased to reduce the work. But there arises such a disadvantage that the data between the primary and secondary data centers often does not coincide with each other because periods during which the data of the secondary data center are old becomes long.

On the other hand, a problem of a second method using the communication line resides in how data to be communicated is appropriately selected.

Japanese Unexamined Patent Publication No. JP 2004-303122A has reported a method using a communication line. In this method, the storage device has a differential map, which is used to manage a difference of data stored in a primary memory unit and a secondary memory unit. In this method, the storage area in each of the primary and secondary memory units are divided into blocks of a certain length, and a bit is allocated to each pair of corresponding blocks in the primary memory unit and the secondary memory unit to produce a bit map. Each bit is controlled so as to indicate whether data in respective blocks of a pair to which the bit is allocated coincides with each other. When the data in respective blocks of a pair does not coincide with each other, the data copying function of the storage devices transfer data from a primary memory unit to a secondary memory unit. Thus, updated data in a primary memory unit is copied to a secondary memory unit.

A disadvantage of this method is that when the data copying function of the storage device begins to work, such as when a disaster recovery system starts its back up service, the function copies the entire data stored in the primary memory unit to the secondary memory unit through a communication line that connects the primary and the secondary data centers, requiring much time and costs for data communication. It is because when the function begins to work, the differential map indicates that the data of the entire blocks in the primary memory unit and the secondary memory unit does not coincide with each other.

SUMMARY OF THE INVENTION

The present invention has been made to improve the above conventional arts. For example, the present invention makes it easy to use a copying method using a removable storage medium, such as tapes, CDs and memory sticks, together with a copying method using a communication line to complement each other. An object of the present invention is to provide a data backup device, a data backup method, and a recording medium storing data backup program capable of keeping the latest data in a secondary data center without frequently sending and receiving removable media and transferring much data via a communication line.

The present invention may be appropriately applied to the disaster recovery system with a primary data enter and a secondary data center. Such a disaster recovery system is widely employed in central or local administrative bodies, banks, finance companies, banking facilities including credit card companies, communication companies, broadcast companies, internet providers, or transport facilities including railroads, plains, or ships to prepare for disaster or unexpected situations.

The first data backup device according to the present invention comprises a first table, a second table, an update management part configured to perform recording in the second table an identifier of updated portion of a first memory, a table rewriting part configured to perform rewriting the first table such that the first table identifies the portion of the first memory identified by the second table, and a data copy control part configured to perform output of first data from the portion of the first memory identified by the first table.

The second data backup device according to the present invention further comprise a backup part configured to perform copying second data of the first memory to a removable recording medium to be stored to a second memory, wherein the data copy control part is configured to perform the output of the first data via a communication line to a secondary device to be copied to the second memory.

The third data backup device according to the present invention has the configuration of the second backup device, wherein the update management part is configured to start the recording after the backup part performs the copying, the table rewriting part is configured to perform the rewriting after the storing of the second data to the second memory, and the data copy control part is configured to start the output after the table rewriting part performs the rewriting.

The fourth data backup device according to the present invention has the configuration of the third data backup device, wherein the backup part is configured to perform the copying in two stage, first stage being copying the second data from the first memory to a third memory and second stage being copying the second data from the third memory to the removable recording medium, and the update management part is configured to start the recording before the back up part performs the second stage.

The first data backup system according to the present invention comprises the second data back up device, the first memory unit, the secondary device, and the second memory.

The second data backup system according to the present invention comprises the third data backup device, the first memory unit, the secondary device, and the second memory.

The third data backup system according to the present invention comprises the fourth data backup device, the first memory unit, the secondary device, the second memory, and the third memory.

The first data backup method according to the present invention comprises recording an identifier of updated portion of a first memory in a second table, rewriting the first table such that the first table identifies the portion identified by the second table, and outputting first data from the portion of the first memory identified by the first table.

The second data backup method according to the present invention further comprises copying second data of the first memory to a removable recording medium to be stored to a second memory, wherein the outputting the first data is performed via a communication line to a secondary device to be copied to the second memory.

The third data backup method according to the present invention has the configuration of the second data backup method, wherein the recording starts after the copying, the rewriting is performed after the storing of the second data to the second memory, and the outputting starts after the rewriting.

The fourth data backup method according to the present invention has the configuration of the third data backup method, wherein the copying performed in two stages, first stage being copying the second data from the first memory to a third memory and second stage being copying the second data from the third memory to the removable recording medium, and the recording starts before the second stage.

The first computer readable medium according to the present invention stores thereon a control program enabling a computer to execute the first data backup method.

The second computer readable medium according to the present invention stores thereon a control program enabling a computer to execute the second data backup method.

The third computer readable medium according to the present invention stores thereon a control program enabling a computer to execute the third data backup method.

The fourth computer readable medium according to the present invention stores thereon a control program enabling a computer to execute the fourth data backup method.

BRIEF DESCRIPTION OF THE DRAWINGS

FIG. 5 is a flowchart showing the operation of update-management-map control means in the embodiment shown in FIG. 1; and FIG. 6 is a flowchart showing the operation of a difference map rewriting means in the embodiment shown in FIG. 1.

DETAILED DESCRIPTION OF THE INVENTION

A detailed description of an embodiment of the present invention will now be given.

Figure 1:
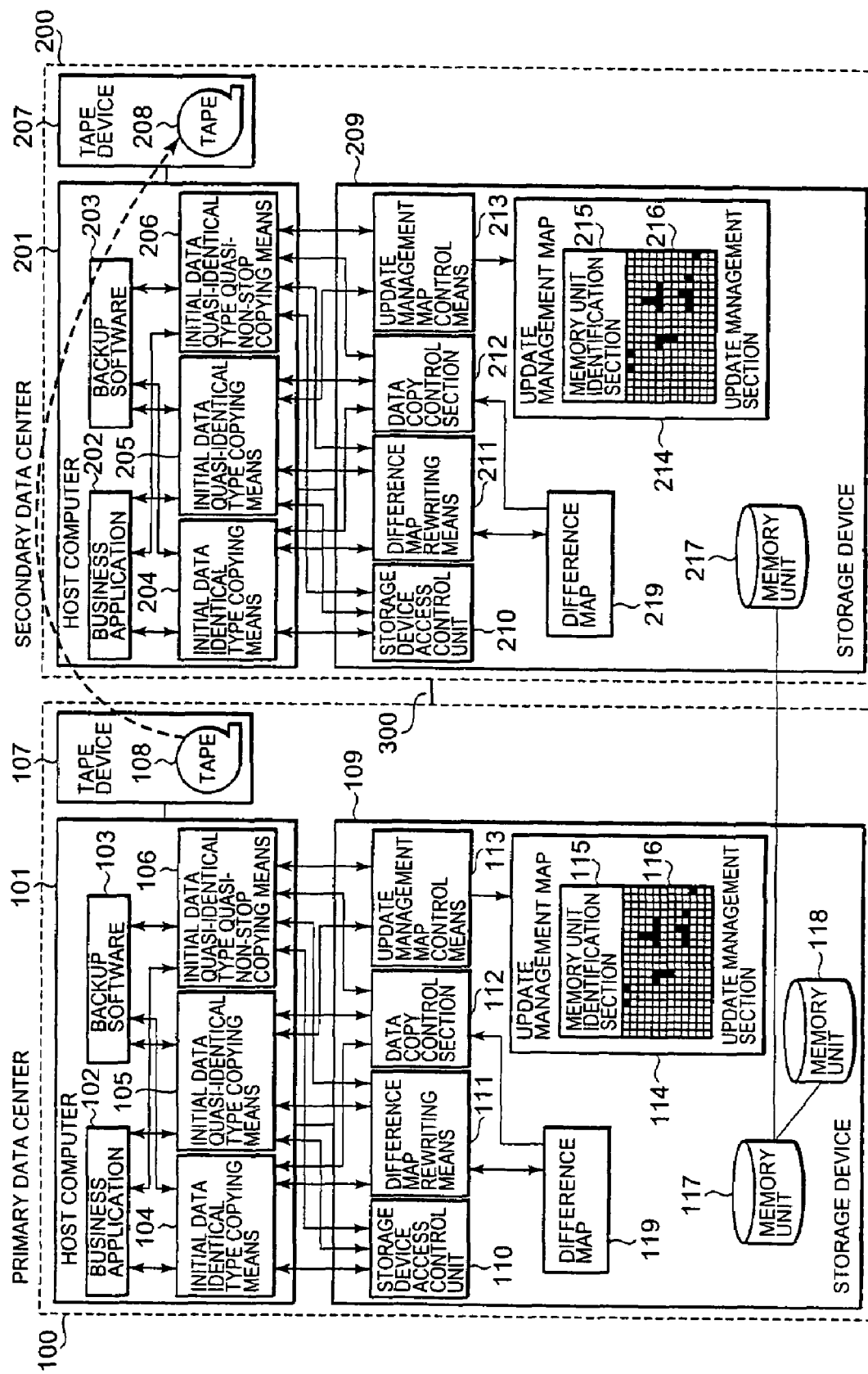
FIG. 1 is a schematic structural diagram showing an embodiment of the present invention.

In FIG. 1, reference numeral 100 denotes a primary data center, and reference numeral 200 denotes a secondary data center. The secondary data center 200 is a backup center. In other words, the secondary data center 200 is so disposed as to take over and execute the business when the primary data center cannot function exemplary due to a disaster. The secondary data center 200 copies the data stored in a memory unit 117 of the primary data center 100 to a memory unit 217, and holds the stored data in the memory unit 217.

The primary data center 100 and the secondary data center 200 often have similar configuration and similar function, respectively; because the primary data center 100 and the secondary data center 200 exchange their roles with each other according to the circumstance. However, a description will be given in the case where, data stored in the primary data center 100 is copied to the secondary data center 200.

The respective data centers 100 and 200 include host computers 101, 201, and storage devices 109, 209. The storage devices 109 and 209 have memory units 117 and 217 that store data which is referred to and updated by the host computers 101 and 201.

The storage devices 109 and 209 of the respective data centers 100 and 200 are connected to each other via a communication line 300. Therefore, the contents of the memory unit 117 of the storage device 109 in the primary data center 100 can be copied to the memory unit 217 of the storage device 209 in the secondary data center 200 through the communication line 300.

Further, the respective primary and secondary data centers 100 and 200 include tape-like storage medium 108 and 208 as storage medium that inputs and outputs data required by the above-mentioned host computers 101 and 201, and tape devices 107 and 207 as storage medium control means that reads and writes the tape-like storage medium 108 and 208, respectively. Any removable recording medium and its drive device can be used in place of tape and tape device. Such media include CDs, memory cards and memory sticks.

As shown in FIG. 1, the host computer 101 includes a business application 102, backup software 103, and copying means 104, 105, and 106 each of them specifying the copying procedure which will be described later. In this example, in the host computer 101, the business application 102 is executed, and refers to and updates the data with respect to the memory unit 117 in the storage device 109. And in the host computer 201, the business application 202 is in a standby status while the business application 102 functions, and takes over the business in the case where the business application 102 stops. To take over the business, the host computer 201 uses data of the memory unit 217 which has been copied from the memory unit 117. Each of the host computers may have other applications than applications 102 and 202.

A data copy control section 112 of the storage device 109 copies the data from the memory unit 117 in the storage device 109 to the memory unit 118 in the same storage device. In addition, the data copy control section 112 copies the data from the memory unit 117 in the storage device 109 to the memory unit 217 in the storage device 209 by communicating with the storage device 209 through the communication line 300.

The storage device 109 has a difference map 119 that identifies the memory portions containing different data between the primary memory unit 117 and the secondary memory unit 217 to manage that differences, and the data copy control section 112 transfers the data identified by the difference map from the primary memory unit 117 to the secondary memory unit 217 to update the data in the secondary memory unit 217.

The storage device 109 also includes a memory unit access control section 110, a difference map rewriting means 111 and a update-management-map control-means 113.

The memory unit access control section 110 controls the access restriction of the memory unit 117. The difference map rewriting means 111 rewrites the difference map 119 according to a request from the host computer 101. The update-management-map control means 113 creates an update-management-map 114 for identifying the updated portion added to the memory unit 117 after a certain time, and manages the update information. In order to identify and manage the updated portion that is added to the memory unit after a certain time, the update-management-map control means 113 divides an area of the memory unit 117 by a block unit of a certain unit length, allocates bits to each block unit in order to indicate whether data in the corresponding block has been updated, or not, and creates the update-management-map in the memory in the storage device 109.

In this example, the update-management-map 114 is made up of 1) a memory unit identification section 115 that stores information to uniquely specify the memory unit to be managed (for example, the memory unit 117), and 2) an update management section 116 that identifies the updated portion of the memory unit to be managed. The update-management-map 114 is easily implemented as a bit map as shown in the explanation below. But it can be any type of set of information that contains information mentioned above.

The backup software 103 and 203 are respectively executed by the host computers 101 and 201, and write data to and read data from the tapes 108 and 208 mounted in the tape devices (recording medium control means) 107 and 207.

In this exemplary embodiment, the host computer 101 includes three types of copying means. They are an initial data identical type copying means 104, an initial data quasi-identical type copying means 105, and an initial data quasi-identical type and non-stop copying means 106. In copying the data, any one of the combination of those means is employed.

(Initial Data Identical Type Copying Means 104)

The initial data identical type copying means 104 stops the operation of the business application 102 that updates the primary memory unit 117, provides the read-only access restriction of the primary memory unit 117, and thereafter copies data from the primary memory unit 117 to the removable memory medium 108 in the primary data center 100. The removable recording medium 108 is transported to the secondary data center 200 by a user, and the recorded contents are copied to the primary memory unit 217. After the completion of copying, the initial data identical type copying means 104 sets all bits of the difference map 119 so as to indicate "no difference" using the difference map rewriting means 111. The initial data identical type copying means 104 starts the data copy control section 112, starts copying referring to the difference map 119, returns the access restriction of the primary memory unit 117 in a read and write enable state, and restarts the operation of the business application 102. In this example, the difference map 119 indicates that there is "no difference" between the primary memory unit 117 and the secondary memory unit 217 when the data copy control section 112 is started. So the data copying function of the storage device 109 does not transfer the data to the secondary memory unit 217 from the primary memory unit 117 when the function begins to work.

(Initial Data Quasi-Identical Type Copying Means 105)

The initial data quasi-identical type copying means 105 stops the operation of the business application 102 that updates the primary memory unit 117, provides the read-only access restriction of the primary memory unit 117, and copies the data from the primary memory unit 117 to the memory medium 108 in the primary data center 100. The initial data quasi-identical type copying means 105 creates the update-management-map 114 that manages the update information regarding the primary memory unit 117 by the update-management-map control means 113, returns the access restriction of the primary memory unit 117 in a read and write enable state, and restarts the operation of the business application 102.

The removable recording medium 108 is transported to the secondary data center 200 by a user, and the recorded contents are copied to the secondary memory unit 217. After the completion of copying, the initial data quasi-identical type copying means 105 using the difference map rewriting means 111 sets the difference map 119 according to the contents of the update-management-map 114 of the primary memory unit 117. That is when a bit in the update-management-map 114 indicates the update of a block in the primary memory unit 117, corresponding bit in the difference map 119 is set so as to indicate there is the difference due to the update. After this rewriting, the difference map 119 identifies all the updated portions recoded or identified in the update-management-map 114. Thereafter the initial data quasi-identical type copying means 105 starts the data copy control section 112 and the data copying function of the storage device 109.

The data copying function of the storage device 109 rapidly copies the contents of the primary memory unit 117 updated after the removable storage medium 108 is written to the secondary memory unit 217 through the communication line 300.

(Initial Data Quasi-Identical Type and Non-Stop Copying Means 106)

The initial data quasi-identical type and non-stop copying means 106 stops the operation of the business application 102 that updates the primary memory unit 117, provides the read-only access restriction of the primary memory unit 117, and copies the data from the primary memory unit 117 to the memory unit 118 in the same storage device 109 by the data copying function of the subject storage device 109. The initial data quasi-identical type and non-stop copying means 106 produces the update-management-map 114 that manages the update information regarding the primary memory unit 117 by the update-management-map control means 113, returns the access restriction of the primary memory unit 117 in a read and write enable state, and restarts the operation of the business application 102. The initial data quasi-identical type and non-stop copying means 106 copies the data from the memory unit 118 to the storage medium 108.

The recording medium 108 is transported to the secondary data center by a user, and the recorded contents are written to the secondary memory unit 217. The initial data quasi-identical type and non-stop copying means 106 sets the update-management-map 114 of the primary memory unit 117 according to the difference map 119 by the difference map rewriting means 111. That is when a bit in the update-management-map 114 indicates the update of a block in the primary memory unit 117, corresponding bit in the difference map 119 is set so as to indicate the difference due to the update. Thereafter the initial data quasi-identical type and non-stop copying means 106 starts the data copy control section 112 and the data copying function of the storage device 109.

When this means is employed, the un-operative period of the business application 112 is limited to the short periods necessary for ensuring the consistency of data in the above data copying process from the primary memory unit 117 to the memory unit 118. And the data copying function of the storage device 109 rapidly copies the contents of the primary memory unit 117 updated after the removable storage medium 108 is written to the secondary memory unit 217 through the communication line 300.

A description will now be given in more detail of the operation of the respective copying means 104, 105 and 106 and their advantages in this embodiment.

(A) Initial Data Identical Type Copying Means (104)

Figure 2:
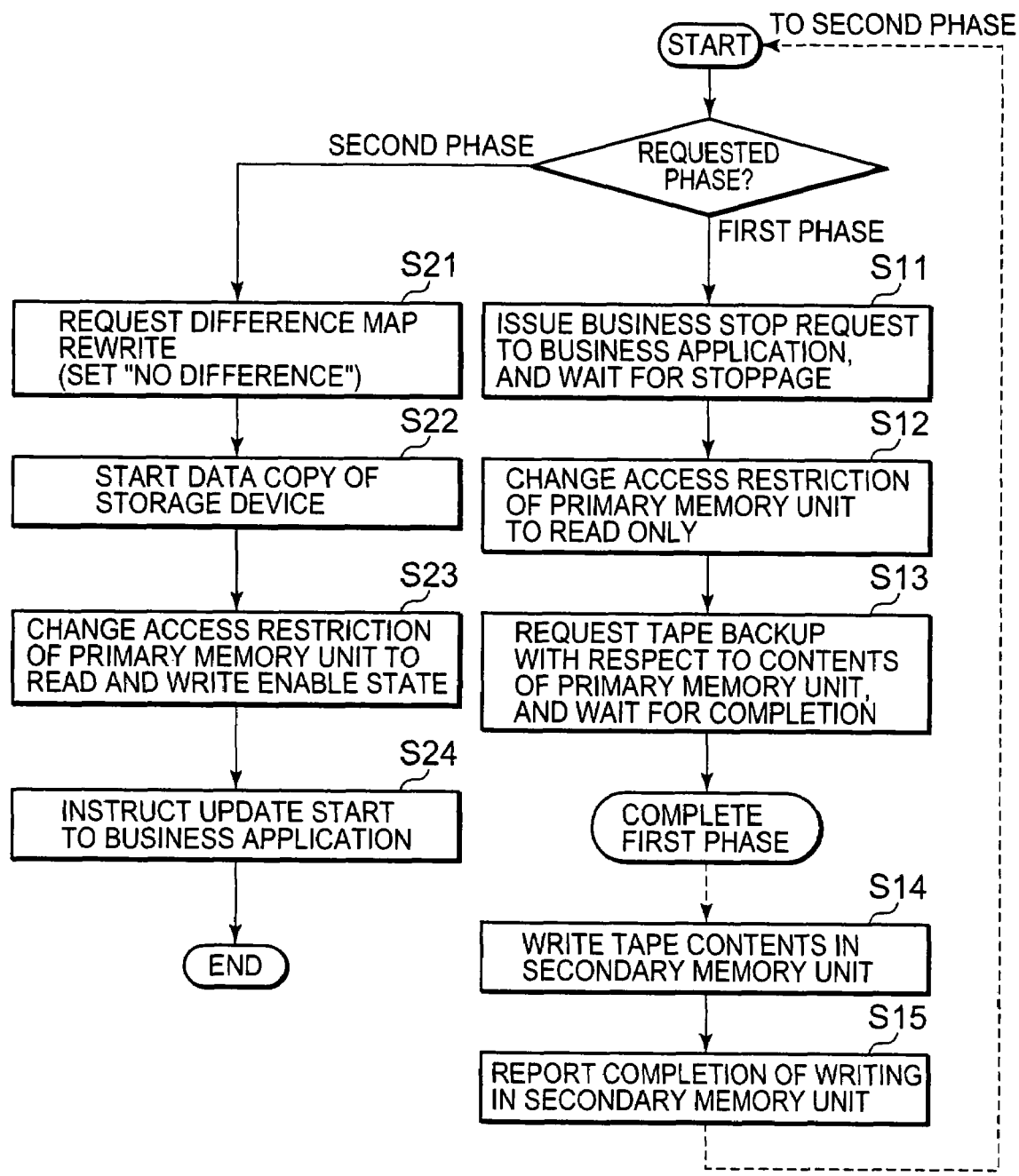
FIG. 2 is a flowchart showing the operation of initial data identical type copying means in the embodiment shown in FIG. 1.

As shown in FIG. 2, a system manager of the primary data center 100 requests the execution of a first phase of copying from the memory unit 117 in the storage device 109 to the memory unit 217 in the storage device 209.

The initial data identical type copying means 104 receives the request, issues a stop request to the business application 102 that conducts update, and waits for the stoppage of the business application 102 (S11: business application stop process). The initial data identical type copying means 104 gives an instruction to the memory unit access control unit 110 of the storage device 109 to change the access restriction of the memory unit 117 to read only (S12: a copying read only process).

In this example, the access restriction instruction function program is executed in the host computer 101 and the access control function program is executed in the storage device 109.

The initial data identical type copying means 104 gives a request to the backup software 103 to copy the contents of the memory unit 117 to the tape 108, and waits for the completion of writing (S13). The first phase is completed with the above process.

A system manager sends the tape 108 to the secondary data center 200. A system manager of the secondary data center 200 sets the tape 108 in the tape device 207, and copies the contents of the tape 108 to the memory unit (secondary memory unit) 217 in the storage device 209 (S14: a copying process at the secondary data center). If online copying operation from the memory unit (primary memory unit) 117 at the storage device 109 to the secondary memory unit 217 is in progress by the data copy control section 112, this operation stops at this time (online copy stop process).

When the writing to the memory unit 217 completes, the system manager at the secondary data center 200 reports the completion to the primary data center 100 (S15: copy completion confirmation process).

Upon receiving the report, the system manager at the primary data center 100 issues to the initial data identical type copying means 104 a request for executing the second phase of copying from the memory unit 117 in the storage device 109 to the memory unit 217 in the storage device 209.

The initial data identical type copying means 104 receives the request and gives an instruction to the difference map writing means 111 in the storage device 109 to set the difference map 119 for the memory unit 117 in the storage device 109 and the memory unit 217 in the storage device 209 into a "no difference" state (S21: difference map initialization process) In the "no difference" state, no bits in the difference map 119 indicate the existence of difference between data stored in the primary memory unit 117 and secondary memory unit 217.

The initial data identical type copying means 104 issues to the data copy control section 112 of the storage device 109 an instruction to start the data copying function for the memory unit 117 in the storage device 109 and the memory unit 217 in the storage device 209 (S22: data copy restart process). The initial data identical type copying means 104 gives the memory unit access control section 110 of the storage device 109 an instruction to change the access restriction of the memory unit 117 to the read and write enable state (S23: copying write restart process). The initial data identical type copying means 104 issues a restart request to the business application 102 (S24: business application restart process). The second phase is completed then.

As described above, the use of the initial data identical type copying means 104 enables the initial data of the primary memory unit 117 to be copied to the secondary memory unit 217 located at a remote place using the storage medium 108 such as a tape medium. Accordingly, it is unnecessary to transfer bulky initial data through the communication line 300 and the communication costs and time can be reduced. Also, the updated data of the primary memory unit 117 after the first data copying means 104 is employed can be copied to the secondary memory unit 217 by the data copying function of the storage device 109, thereby making it possible to keep the latest data in the secondary memory unit 217.

(B) Initial Data Quasi-Identical Type Copying Means 105

Figure 3:
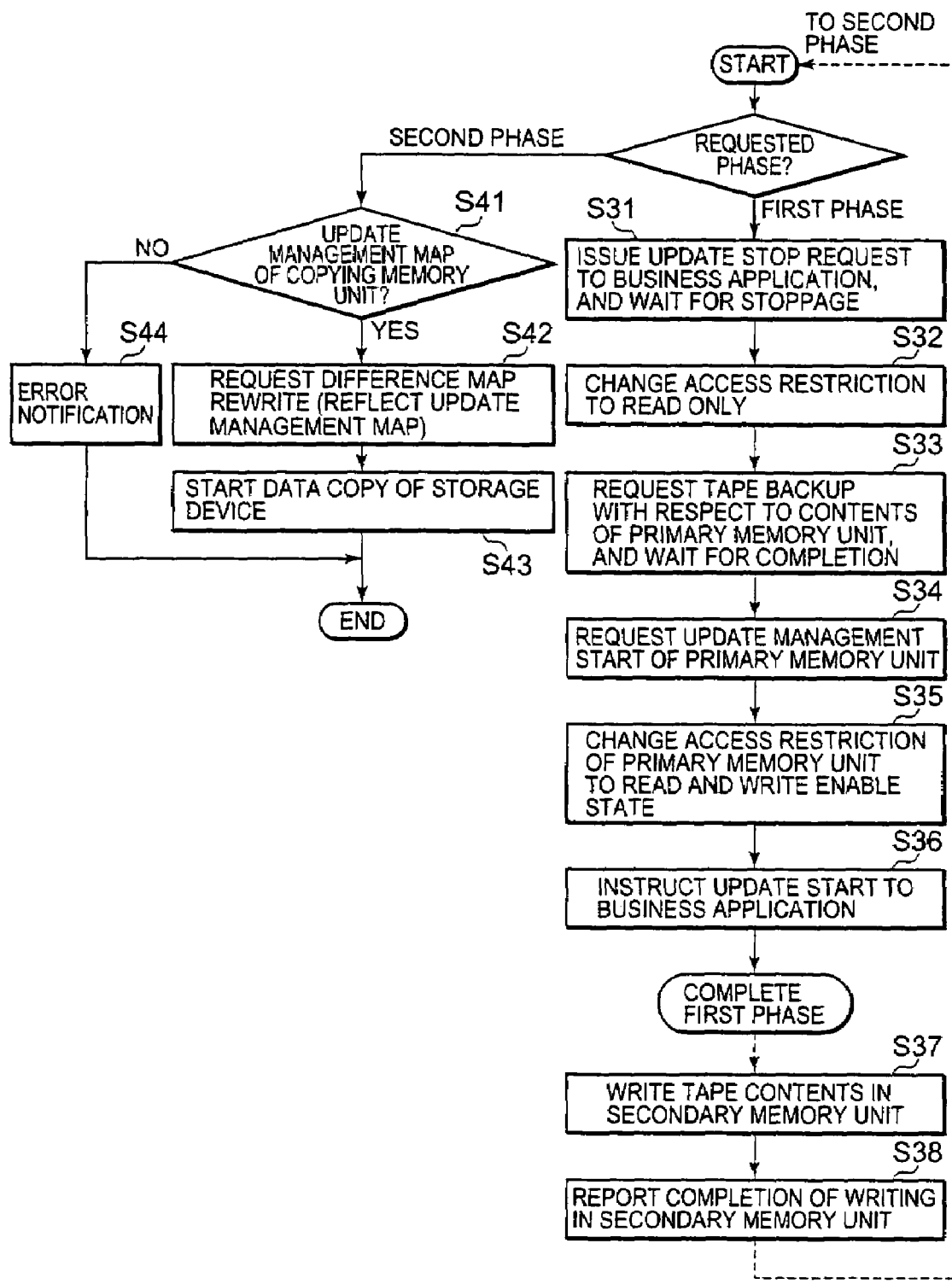
FIG. 3 is a flowchart showing the operation of initial data quasi-identical type copying means in the embodiment shown in FIG. 1.

As shown in FIG. 3, the system manager of the primary data center 100 requests the initial data quasi-identical type copying means 105 to execute the first phase of copying from the memory unit 117 in the storage device 109 to the memory unit 217 in the storage device 209.

The initial data quasi-identical type copying means 105 receives the request, issues a stop request to the business application 102 that updates the memory unit 117, and waits for the stoppage of the business application 102 (S31: business application stop process).

The initial data quasi-identical type copying means 105 instructs the memory unit access control section 110 of the storage device 109 to change the access restriction of the memory unit 117 to read only (S32: read only process at the primary data center) The initial data quasi-identical type copying means 105 instructs the backup software 103 to copy the contents of the memory unit 117 to the tape (storage medium) 108, and waits for the completion of copying (S33: storage medium copying process).

If online copying operation from the memory unit (primary memory unit) 117 at the storage device 109 to the secondary memory unit 217 is in progress by the data copy control section 112, this operation stops at this time (online copy stop process).

The initial data quasi-identical type copying means 105 instructs the update-management-map control means 113 of the storage device 109 to record in the update-management-map 114 the information identifying the portion updated in the memory unit 117 thereafter (S34: update management start process).

The initial data quasi-identical type copying means 105 instructs the memory unit access control section 110 of the storage device 109 to change the access restriction of the memory unit 117 to a read and write enable state (S35: write restart process at the primary data center) and issues the restart request to the business application 102 (S36: business application restart process). The first phase is completed with the above operation.

The system manager of the primary data center 100 sends the tape 108 to the secondary data center 200. At the secondary data center 200, the system manager thereof sets the tape 108 in the tape device 207, and stores the contents of the tape 108 in the memory unit 217 of the storage device 209 (S37: copying process at the secondary data center). When the storing is completed, the system manager of the secondary data center 200 reports the completion to the primary data center 100 (S38: copy completion confirming process).

Upon receiving the report, the system manager of the primary data center 100 issues the request for the second phase of the copying to the initial data quasi-identical type copying means 105.

The initial data quasi-identical type copying means 105 receives the request and inquires of the update-management-map control means 113 in the storage device 109 whether the update-management-map 114 of the memory unit 117 exists or not (S41) When the update-management-map 114 of the memory unit 117 does not exist, the update-management-map control means 113 issues an error notification (S44).

When the update-management-map 114 of the memory unit 117 exists, the initial data quasi-identical type copying means 105 instructs the update-management-map control means 113 in the storage device 109 to rewrite the difference map 119 which manages the memory unit 117 and the memory unit 217 based on the contents of the update-management-map 114 (S42: difference map rewrite process). After this rewriting, the difference map 119 identifies the the updated portions recoded or identified in the update-management-map 114. The update management by the update-management-map control means 113 ends its operation at the same time (update management completion process).

The initial data quasi-identical type copying means 105 instructs the data copy control section 112 of the storage device 109 to start the online data copying from the memory unit 117 to the memory unit 217 (S43: online copy restart process).

The second phase is completed with the above operation. And the setup of the online data copying function by the data copy control section 112 of the storage device 109 is completed. In this embodiment, when the online data copying starts, a difference between memory unit 117 and memory unit 217, which has been managed by the update-management-map 114, exists.

As described above, the use of the second data copying means 105 enables the initial data in the primary memory unit 117 to be copied to the secondary memory unit 217 not through the communication line 300 but via the storage medium. Accordingly, the costs and time for communication can be remarkably reduced.

In addition, since the operation of the business application 102 can start after data of the primary memory unit 117 has been written into the memory medium 108, the period during which operation of the business application 102 stops is shorter than when the data copy by the initial data identical type copying means 104 is used. Also, since the update of the initial data of the primary memory unit 117 is copied online to the secondary memory unit 217 by the data copying function by the data copy control section of the storage device 109, the data of the secondary memory unit 217 can be kept to the latest data. Therefore, delay in copying the updated date is avoided. Such a delay occurs when only the storage medium 108 is used for the data coping.

(C) Initial Data Quasi-Identical Type and Non-Stop Copying Means

Figure 4:
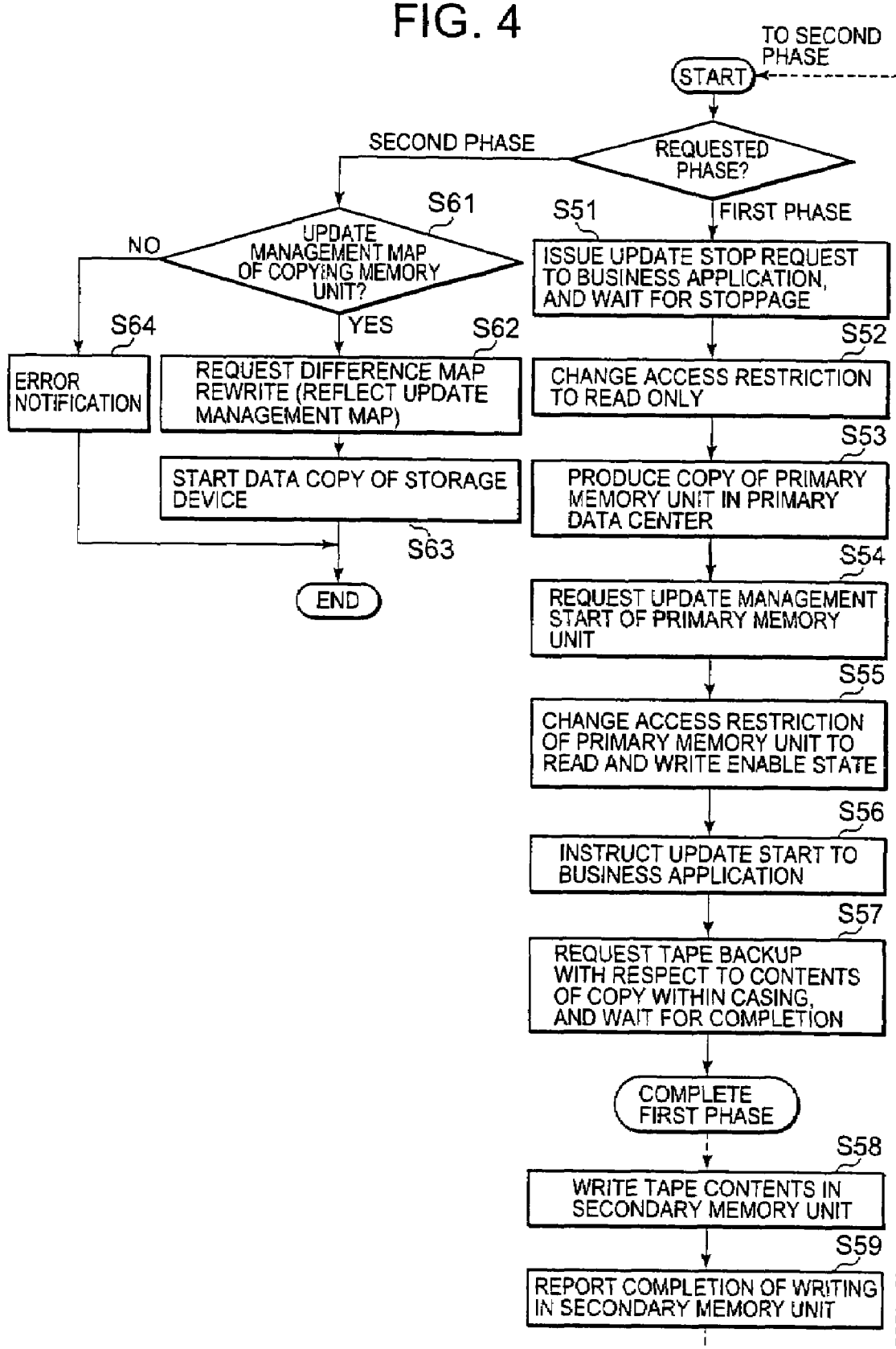
FIG. 4 is a flowchart showing the operation of initial data quasi-identical type and non-stop copying means in the embodiment shown in FIG. 1.

A description will now be given of copying by the initial data quasi-identical type and non-stop copying means 106 in the host computer 101 with reference to FIG. 4.

The storage device 109 is set in advance so that the data copying function thereof can copy the data of the memory unit 117 to the memory unit 118.

The system manager of the primary data center 100 requests the initial data quasi-identical type and non-stop copying means 106 to execute the first phase of copying from the memory unit 117 to the memory unit 217.

Receiving the request, the initial data quasi-identical type and non-stop copying means 106 requests the business application 102 to stop its operation, and waits for its stoppage (S51: business application stop process). The initial data quasi-identical type and non-stop copying means 106 requests the memory unit access control section 110 of the storage device 109 to change the access restriction of the memory unit 117 to read only (S52: read only process at the primary data center).

The initial data quasi-identical type and non-stop copying means 106 instructs the data copy control section 112 of the storage device 109 to copy the data in the memory unit 117 to the memory unit 118 within the same storage device 109 (S53: temporary copy storing process). A process of online copying from the primary memory unit 117 to the secondary memory unit 217 is temporarily stopped before execution of the temporary copy storing process (S53) (online copy stop process).

The initial data quasi-identical type and non-stop copying means 106, 1) requests the update-management-map control means 113 of the storage device 109 to record the portion that is updated in the memory unit 117 thereafter (S54: update management start process), 2) requests the memory unit access control section 110 of the storage device 100 to change the access restriction of the primary memory unit 117 to the read and write enable state (S55: write restart process at the primary data center), 3) requests the business application 102 to restart (S56: business application restart process) and 4) requests the backup software 103 to write the contents of the memory unit 118, which is a copy of the memory unit 117, to the tape 108, and waits for the completion (S57: storage medium copying process) The first phase is completed with the above operation.

The system manager of the primary data center 100 sends the tape 108 to the secondary data center 200. The system manager of the secondary data center 200 loads the tape 108 into the tape device 207, and writes the contents of the tape 108 to the memory unit 217 in the storage device 209 (S58: copying process at the secondary data center). When the writing to the memory unit 217 completes, the system manager of the secondary data center 200 reports the completion to the system manager of the primary data center 100 (S59: copy completion confirming process).

Upon receiving the report, the system manager at the primary data center 100 requests the initial data quasi-identical type and non-stop copying means 106 to begin the second phase of the copying.

The initial data quasi-identical type and non-stop copying means 106 receives the request and inquires of the update-management-map control means 113 in the storage device 109 whether the update-management-map of the memory unit 117 exists or not (S61). When the update-management-map of the memory unit 117 does not exist, the update-management-map control means 113 issues an error notification (S64).

When the update-management-map of the memory unit 117 exists, the initial data quasi-identical type and non-stop copying means 106 instructs the update-management-map control means 113 in the storage device 109 to rewrite the contents of the difference map 119 which manages the memory unit 117 and the memory unit 217 based on the contents of the update-management-map 114 (S62: difference map rewrite process). After this rewriting, the difference map 119 identifies the updated portions recoded or identified in the update-management-map 114. The update management by the update-management-map control means 113 ends its operation at the same time (update management completion process).

The initial data quasi-identical type and non-stop copying means 106 instructs the data copy control section 112 to start the data online copying from the memory unit 117 to the memory unit 217 (S63: online copy restart process).

The second phase is completed with the above operation. And the setup of the data copying function by the data copy control section 112 of the storage device 109 is completed. In this embodiment, when the online data copying starts, a difference between memory unit 117 and the memory unit 217, which has been managed by the update-management-map 114, exists.

Additional to the merits of the second copying means 105 described above, the periods for which the business application 102 stops its operation can be reduced further since the data which the third data copying means 106 writes to the storage medium 108 are not the contents of the primary memory unit 117 but are their copy produced in the memory unit 118.

(Operation of Update Management Control Means 113)

A description will now be given of the update-management-map control means 113 that is used in order to record and manage the updated portion of the primary memory unit 117.

As shown in FIG. 5, upon receiving the request to manage the memory unit 117 from the host computer 101, the update-management-map control means 113 creates the update-management-map 114 in the memory area in the storage device 109 (S71).

The update-management-map 114 is made up of 1) the memory unit identification section 115 to indicate the memory unit which the map manages, and 2) the update management section 116 where the information for identifying the updated portion of the memory unit 117 is recorded. For this purpose, the storage area of the memory unit 117 is divided into a block of a certain unit length and bits are allocated to the update management section 116 such that each bit represents a block and indicates whether the data in the block is updated or not.

The update management section 116 has the same format as that of the difference map 119 which is used by the online data copying function of the data copy control section 112 in the storage device 109 with respect to the memory unit 117 and the memory unit 217.

The respective bits of the update management section 116 can have two values that express "updated" or "not updated". For example, a value indicative of "undated" is identical with a value indicative of a difference in the difference map of the online data copying function, and a value indicative of "not undated" is identical with a value indicative of no difference in the difference map. The update-management-map control means 113 writes an identifier for the memory unit 117 in the memory unit identification section 115 (S72).

The update-management-map control means 113 sets initial value "not updated" to all of the bits in the update management section 116 (S73). Thereafter, when the data of the memory unit 117 is updated, the update-management-map control means 113 sets the value indicative of "updated" in the bits in the update management section 116 corresponding to the updated block (S74). Thus the update management section 116 records the identifying information of the updated block of the memory unit 117.

When the update-management-map control means 113 receives the reference request of the update-management-map of the memory unit 107 from the host computer 101, the update-management-map control means 113 refers to the identifier of the memory unit identification section 115 of all the update-management-maps 114, thereby retrieving the update-management-map 114 of the subject memory unit (S81) When no update-management-map 114 of the memory unit exists, the update-management-map control means 113 issues an error notification and completes the operation (S83). When the update-management-map 114 of the memory unit exists, the update-management-map control means 113 returns the retrieved information of the update-management-map 114(S82).

(Difference Map Writing Means 111)

A description will now be given of the difference map rewriting means 111 for rewriting the difference map 119 with respect to the primary memory unit 117 and the secondary memory unit 217.

As shown in FIG. 6, the difference map writing means 111 responds to the difference map write request from the host computer 101. When requested to set to "no difference", the difference map writing means 111 sets all the bits of the difference map 119 to a value that expresses no difference (S91). When requested to reflect an update-management-map 114 to the difference map 119, the difference map writing means 111 refers to the update-management-map 114 of the subject memory unit (S101) and copies the contents of the update management section 116 of the update-management-map 114 to the difference map 119(S102) if the update-management-map 116 exists. The difference map writing means 111 issues an error notification and completes the operation (S103) when the update-management-map 114 dose not exist. Thus, the difference map 119 identifies the memory portion identified by the update-management-map 116.

Any of the initial data identical type copying means 104, the initial data quasi-identical type copying means 105, and the initial data quasi-identical type and non-stop copying means 106, the memory unit access control section 110, the difference map rewriting means 111, the data copying control section 112, and the update-management-map control means 113 can be embodied as a program executable by a computer.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data backup device comprising:
    a first table,
    a second table,
    an update management part configured to perform recording in said second table an identifier of updated portion of a first memory, a table rewriting part configured to perform rewriting said first table such that said first table identifies the portion of said first memory identified by said second table, a data copy control part configured to perform output of first data from the portion of said first memory identified by said first table, and a backup art configured to perform copying second data of said first memory to a removable recording medium to be stored to a second memory, wherein, said data copy control part is configured to perform said output of said first data via a communication line to a secondary device to be copied to said second memory, said update management part is configured to start said recording after said backup part performs said copying, said table rewriting part is configured to perform said rewriting after said storing of said second data to said second memory, and said data copy control part is configured to start said output after said table rewriting part performs said rewriting.

2. The data backup device in claim 1, wherein said backup part is configured to perform said copying in two stages, first stage being copying said second data from said first memory to a third memory and second stage being copying said second data from said third memory to said removable recording medium, and said update management part is configured to start said recording before said back up part performs said second stage.

3. A data backup method comprising:

recording an identifier of updated portion of a first memory in a second table, rewriting said first table such that said first table identifies the portion identified by said second table, outputting first data from the portion of said first memory identified by said first table, and copying second data of said first memory to a removable recording medium to be stored to a second memory, wherein, said outputting said first data is performed via a communication line to a secondary device to be copied to said second memory, said recording starts after said copying, said rewriting is performed after said storing of said second data to said second memory, and said outputting starts after said rewriting.

4. The data backup method in claim 3, wherein said copying performed in two stages, first stage being copying said second data from said first memory to a third memory and second stage being copying said second data from said third memory to said removable recording medium, and said recording starts before said second stage.

5. A computer readable medium storing thereon a control program enabling a computer to execute a method comprising:

recording an identifier of updated portion of a first memory in a second table, rewriting said first table such that said first table identifies the portion identified by said second table, outputting first data from the portion of said first memory identified by said first table, and copying second data of said first memory to a removable recording medium to be stored to a second memory, wherein, said outputting said first data is performed via a communication line to a secondary device to be copied to said second memory, said recording starts after said copying, said rewriting is performed after said storing of said second data to said second memory, and said outputting starts after said rewriting.

6. A computer readable medium storing thereon a control program enabling a computer to execute said method in claim 4.

7. A data backup device comprising:

a first table, a second table, an update management means for recording in said second table an identifier of updated portion of a first memory, a table rewriting means for rewriting said first table such that said first table identifies the portion of said first memory identified by said second table, a data copy control means for outputting of first data from the portion of said first memory identified by said first table, and a backup means for copying second data of said first memory to a removable recording medium to be stored to a second memory, wherein, said data copy control means for outputting said first data via a communication means to a secondary device to be copied to said second memory, said update management means starting said recording after said backup means performs said copying, said table rewriting means starting said rewriting after said storing of said second data to said second memory, and said data copy control means starting said outputting after said table rewriting means performs said rewriting.

8. The data backup device in claim 7, wherein said backup means copying in two stages, a first stage being copying said second data from said first memory to a third memory and second stage being copying said second data from said third memory to said removable recording medium, and said update management means starting said recording before said back up means performs said second stage.

* * * * *